United States Patent [19]

Mobley

[11] Patent Number: 4,471,380
[45] Date of Patent: Sep. 11, 1984

[54] SCRAMBLING AND DESCRAMBLING OF TELEVISION SIGNALS FOR SUBSCRIPTION TV

[75] Inventor: Joseph G. Mobley, Dunwoody, Ga.

[73] Assignee: Scientific-Atlanta, Inc., Atlanta, Ga.

[21] Appl. No.: 358,135

[22] Filed: Mar. 15, 1982

[51] Int. Cl.³ .......................... H04N 7/16; H04K 1/04
[52] U.S. Cl. ..................... 358/120; 358/117; 358/122; 358/123
[58] Field of Search ................. 358/117, 120, 122–124

[56] References Cited

U.S. PATENT DOCUMENTS

| | | | |
|---|---|---|---|
| 2,862,048 | 11/1958 | Roschke | 358/122 |
| 2,889,399 | 6/1959 | Hammond, Jr. | 358/119 |
| 3,184,537 | 5/1965 | Court et al. | |
| 3,530,232 | 9/1970 | Reiter et al. | |
| 3,777,053 | 12/1973 | Wittig et al. | 358/117 |
| 3,919,462 | 11/1975 | Hartung et al. | 358/124 |
| 4,068,264 | 1/1978 | Pires | 358/124 |
| 4,091,417 | 5/1978 | Nieson | 358/124 |
| 4,095,258 | 6/1978 | Sperber | |
| 4,115,807 | 9/1978 | Pires | 358/122 |
| 4,338,628 | 7/1982 | Payne et al. | 358/120 |

Primary Examiner—S. C. Buczinski
Attorney, Agent, or Firm—Martin LuKacher

[57] ABSTRACT

Subscription TV premium programming may be encoded with tagging information as by transmitting a tagging pulse during at least one horizontal line interval of each picture field in addition to pulses which are used to time the restoration of horizontal sync in the descrambler of a sync suppressed scrambling system. The additional tagging pulses provide information necessary to enable or disable the descrambler, and thereby provide high level encoding with minimum hardware complexity.

28 Claims, 3 Drawing Figures

SCRAMBLING AND DESCRAMBLING OF TELEVISION SIGNALS FOR SUBSCRIPTION TV

DESCRIPTION

The present invention relates to subscription TV and particularly to methods and apparatus for scrambling and descrambling TV signals so that they may be displayed only at authorized receiving stations.

The invention is especially suitable for use in scrambling and descrambling systems where sync intervals of the TV signals are suppressed and then reinserted at the appropriate location in the video waveform. Features of the invention are applicable for other types of scrambling and wherever a higher level of encoding of scrambling information is desired in order to discourage unauthorized reception of the premium programming.

While various schemes have been suggested to compound the encoding system used to protect subscription TV programming from unauthorized reception, the problem remains to provide a high level of encoding with minimum hardware complexity. Complex hardware is involved in systems which send the multibit coded data words modulated on the sound carrier during the vertical retrace interval of the TV signal. The coded data contains the channel number and information to authorize a particular set of descramblers to work. Such a scheme is disclosed in U.S. Pat. No. 3,919,462 issued Nov. 11, 1975. Another scheme uses a separate carrier which is located outside of the band of the TV signal. This carrier is modulated with a multibit pattern, for example tones, containing information identifying the authorized channels (see U.S. Pat. No. 3,184,537, issued May 18, 1965). The transmission of the multibit codes requires precision telemetry for the transmission of the code words. Complex encoders and decoders are also needed. The scheme where the codes are transmitted on out-of-band carrier even requires a separate receiver tuned to that carrier. The hardware complexity and consequent cost of high level encoding has caused it not to be adopted, notwithstanding that high level coding is desirable to discourage and prevent unauthorized reception of the premium subscription TV programs.

It is also desirable to provide for high level encoding of premium programming which is compatible with the sync suppressed scrambling and descrambling systems which are used extensively for premium programming. Such a system is described in U.S. patent application Ser. No. 334,040 filed Dec. 23, 1981 in the name of Robert O. Banker and assigned to the same assignee as this application. In such sync suppressed systems, amplitude modulated, band-limited timing pulses are transmitted on the audio or sound carrier. These timing pulses are synchronous with the horizontal sync intervals and are used to time the reinsertion of the suppressed horizontal sync at the appropriate location on the video signal which accompanies the audio.

Briefly, in a system in accordance with the invention additional pulses, referred to as tag or tagging pulses are transmitted during a predetermined line interval. The additional pulses compound the encoding of the television signal and allow for channel identification to remotely enable or disable the descramblers at the receiving stations where the subscribers are located.

In accordance with the invention, an additional tag pulse may be transmitted during at least one horizontal interval and repeated during each picture field. The tag pulse identifies the channel number of the received signal by virtue of the line number (time slot) associated with the tag pulse. One additional tag pulse can identify any one of 262 possibilities, since a field has at least 262 lines (horizontal sweeps between vertical retrace intervals). Transmitting additional tagging pulses on different lines within a field, further compounds the encoding. For example, two pulses on two different lines within a field, provides 34,191 possible codes.

In implementing the invention, counting means may be used to count the horizontal line number which is transmitted. In a suppressed sync system, the timing pulses which control the descrambler may be used to increment a line counter. The occurrence of a tag pulse and the state of the counter when the tag pulse occurs identifies the channel. Memory means, such as a programmable read only memory (PROM), may be used to verify the receipt of the encoded information and authorize descrambling. The state of the counter may be used as the PROM address. The coincidence of an output from the PROM at a predetermined address corresponding to the predetermined line number and a tag pulse received on that line enables the descrambler. The descrambler is disabled and the video signal is intermittently disconnected to disrupt it and further distort the display on the TV receiver, if the PROM contents at the address pointed to by the counter is not an authorized line when the tag pulse is received. A high level of encoding which discourages unauthorized viewing of premium programming may thereby readily be obtained.

Accordingly, it is an object of the present invention to provide improved methods and apparatus for the scrambling and descrambling of television signals.

It is another object of the invention to provide an improved system and method for obtaining high level encoding of television signals with a minimum of hardware complexity.

It is a further object of the present invention to provide an improved system and method for scrambling and descrambling of TV signals which does not require the transmission of a complex code word.

It is a still further object of the present invention to provide an improved system and method for the transmission of sync suppressed TV signals which enables them to be encoded with a high degree of coding efficiency and with minimum hardware complexity.

The foregoing and other objects, features and advantages of the invention as well as the best mode now known for practicing the invention and the presently preferred embodiment thereof will become more apparent from a reading of the following description in connection with the accompanying drawings in which.

Figure 1:
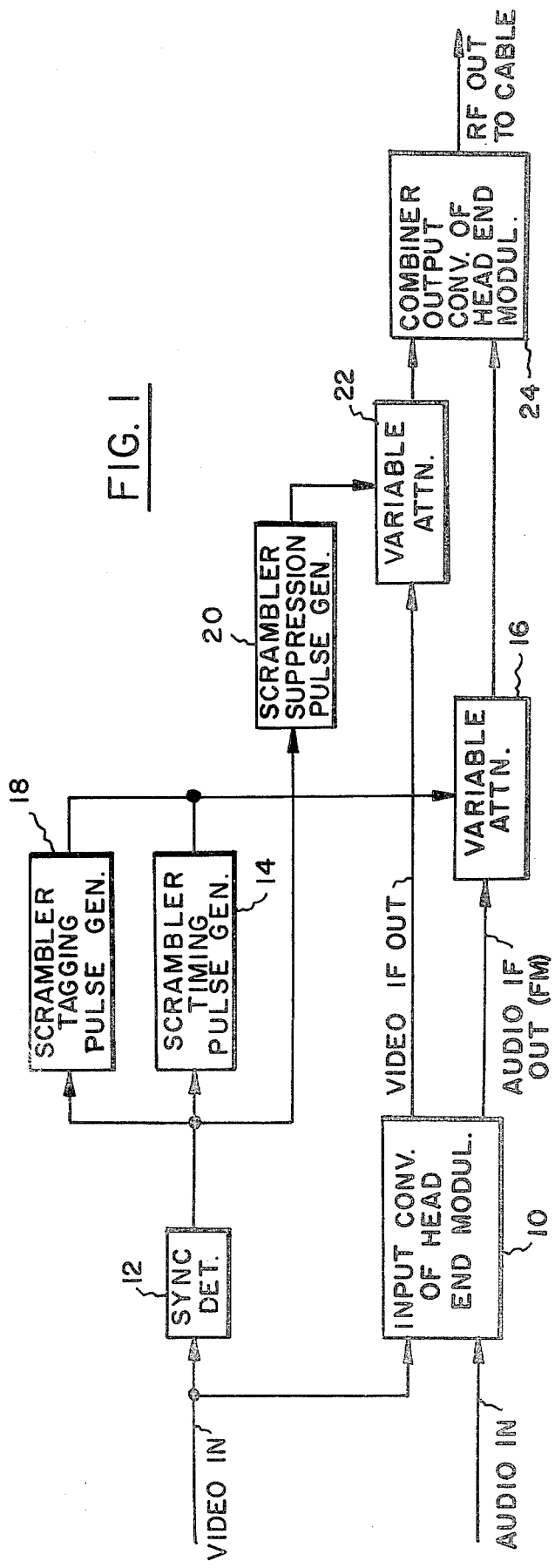
FIG. 1 is a block diagram illustrating, in a general manner, a system for sync suppression scrambling in accordance with the invention.

The scrambler system shown in FIG. 1 is located at the heat end of the cable system. The baseband video input of the premium programming is converted at the head end of the cable system by an input converter 10 to IF frequency. The accompanying audio signal is similarly converted. A sync detector 12 detects the horizontal sync pulses. A scrambler timing pulse generator 14 generates timing pulses with a delay with respect to the horizontal sync pulses. The timing pulses are applied to a variable attenuator 16 which effectively amplitude modulates the FM carrier of the auido IF signal as by attenuating it except during the timing pulse.

A scrambler tagging pulse generator 18 also responds to the horizontal sync pulses and outputs a tagging pulse slightly ahead of the timing pulse in a predetermined horizontal line interval. The tagging pulse generator may include a counter reset by the vertical sync pulses which counts the horizontal sync pulses. After a count equal to the number of the horizontal line in the picture field which is selected, the tagging pulse is generated. This tagging pulse is also applied to the variable attenuator 16 and operates it to remove the attenuation during the tagging pulse. Accordingly, on the predetermined line of the field, the audio IF will have a tagging pulse followed by a timing pulse. The tagging pulse generator may generate the tagging pulse by means of a horizontal line counter and PROM arrangement similar to that used in the descrambling system shown in FIG. 3 which is described in detail hereinafter. It will be noted that synchronization is inherent in this system in that the horizontal sync pulses (the horizontal line rate) is used as the basic data rate in transmission of encoding information.

A scrambler suppression pulse generator 20 generates the suppression pulse coincidentally with the horizontal sync intervals. Since both the suppression and timing pulses derive their timing from the sync pulses in the video signal, the selected time relationship between the timing of the suppression pulses is maintained during each line of the television signal. The scrambler suppression pulse generator 20 generates the suppression pulses with sufficient delay to make up the difference in delay in the video and audio IF channels. Another variable attenuator 22 in the video IF channel suppresses the horizontal sync signal and outputs the scrambled video IF signal to the output combiner and converter 24 of the head end modulator. The converter locates the FM audio signal adjacent to the video signal in the RF channel allocated to the premium programming. This RF signal may be applied to the cable at the head end of the cable TV system. Accordingly, the TV signal is scrambled and then encoded with the timing and tagging pulses on the FM audio.

Figure 2:
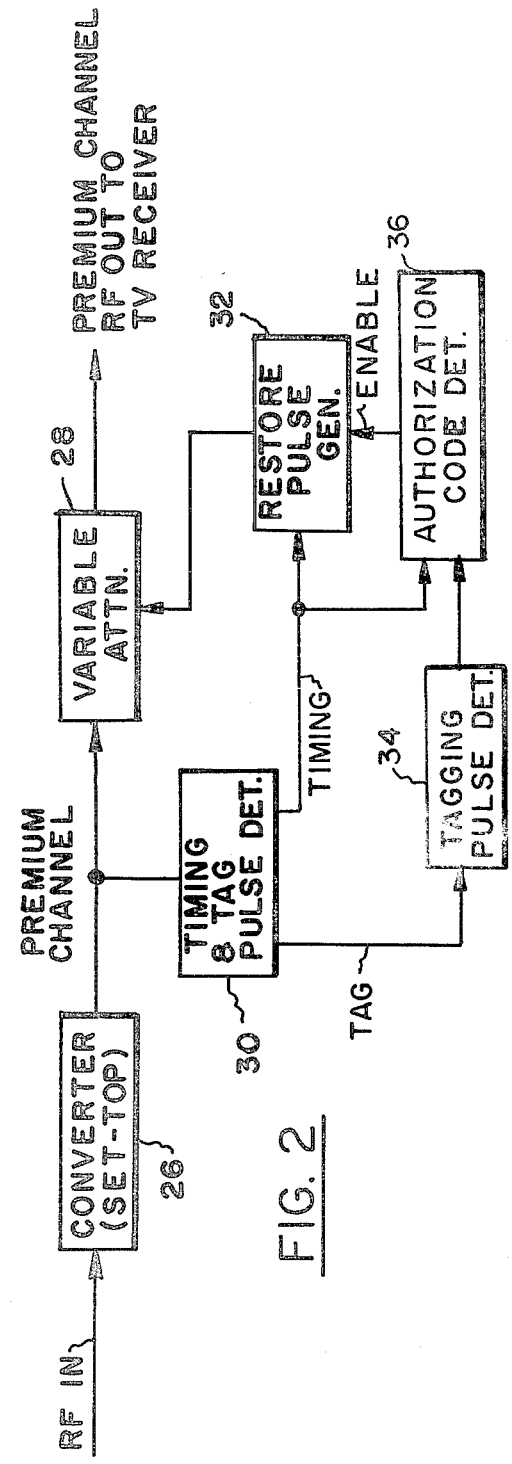
FIG. 2 is a block diagram illustrating, in a general manner, a system for sync suppression descrambling in accordance with the invention.

Each receiving station which is adapted to receive subscription TV is provided with a system which is shown in general in FIG. 2. The RF input from the cable goes to the set top converter 26 which converts the cable channels to a standard channel frequency band of the TV receiver which is to display the subscription programming. Other channels may, of course, be selected by the converter 26. The TV signal with audio and video combined is, when the premium channel is selected, connected through a variable attenuator 28 to the input terminal (the antenna terminals) of the TV receiver. The variable attenuator 28 and other circuits for descrambling may be contained in the set top converter. The scrambling timing and tag pulses are detected from the FM audio components of the TV signal by a timing and tag pulse detector 30. This detector may include the usual traps and filters for the audio component of the TV signal and a diode AM detector. The timing pulses are applied to a restore pulse generator 32 which subjects the pulse to a delay corresponding to the delay imposed by the scrambler timing pulse generator 14 with respect to its succeeding horizontal sync pulse. The delayed timing pulse is used to time the generation of restoring pulses coincident with the horizontal sync pulses so as to restore and descramble the premium channel output.

The restore pulse generator 32 is, however, enabled only when the tag pulse is detected in a tagging pulse detector 34. In only the predetermined horizontal line interval will the tag pulse be followed by a timing pulse. The tagging pulse detector will therefore provide an output only during the predetermined horizontal line interval or time slot. This output is applied to an authorization code detector 36 in which the timing pulses are counted. Only when the tagging pulse detector output occurs during the predetermined horizontal line corresponding to the timing pulse count, does the authorization code detector 36 enable the restore pulse generator 32. Unless the predetermined line number is known, the authorization code will not be detected and the scrambled TV signal will proceed out of the RF output of the set top converter to the TV receiver. The authorization code may be changed from time to time to further thwart the unauthorized use of premium programming.

It will therefore be seen that the method and system of the invention provides for generating of tagging pulses which correspond to at least one predetermined line in each picture field of the TV signal which are scrambled and transmitted with the tagging pulses to the receiving stations. At the receiving stations the reception of the tagging pulses with their corresponding line are identified and then, and only then, are the TV signals descrambled at the receiving station.

Figure 3:
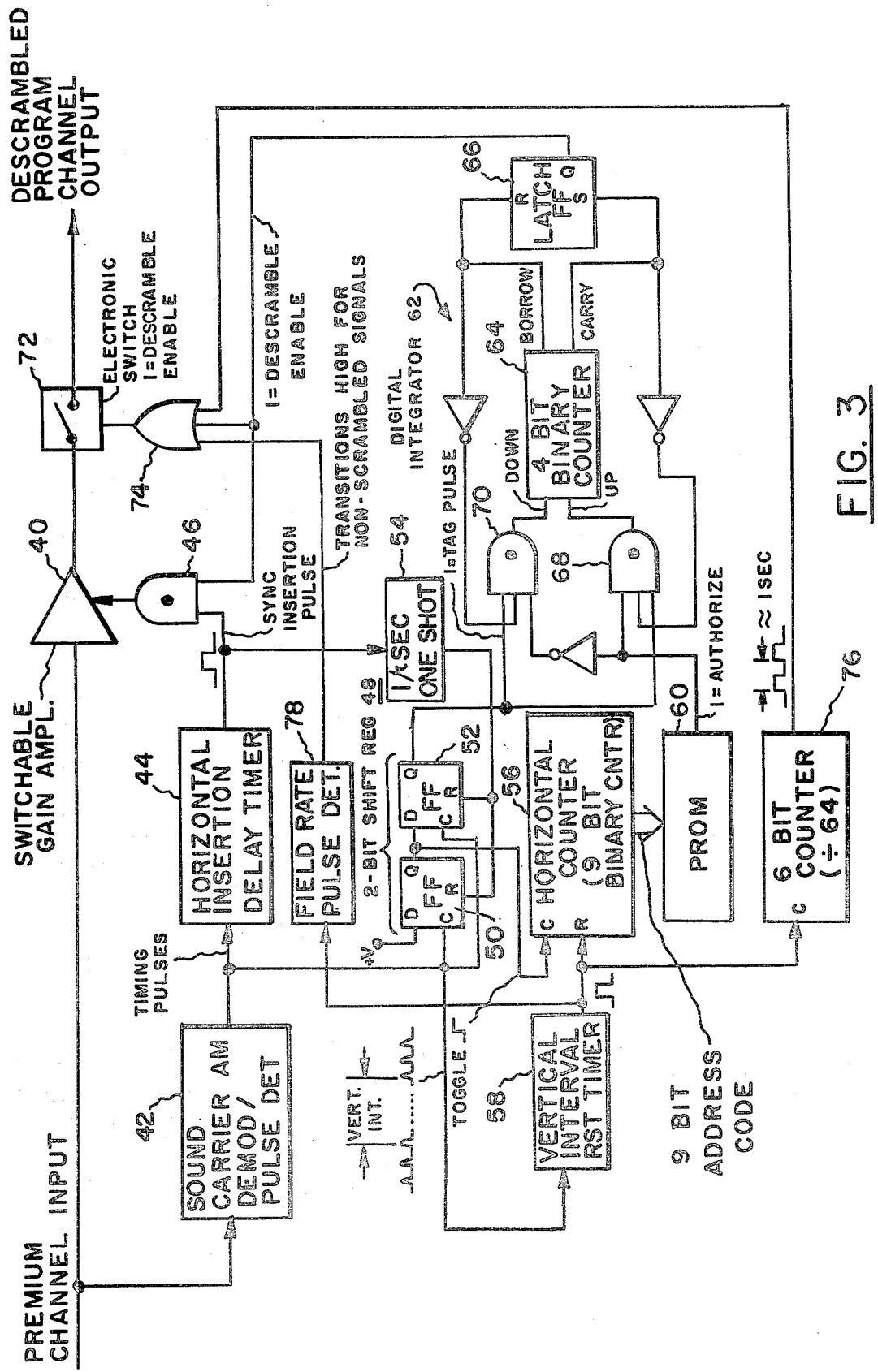
FIG. 3 is a more detailed block diagram illustrating a descrambling system embodying the invention.

Referring next to FIG. 3 the preninum channel input from the set top converter is fed to a switchable gain amplifier 40 which serves as the variable attenuator. This amplifier passes the signal unaltered with a gain of 0 dB during the information portion of each horizontal line. During the horizontal retrace where the horizontal sync pulse (blanking plus sync tip) occurs, the gain of the amplifier 40 is increased by 6 dB. This increase in gain restores the correct level of the signal during the horizontal interval. The restoring pulse is provided by the circuitry responsive to the timing pulses which is discussed below. The variable attenuator 22 in the scrambler (FIG. 1) attenuates the signal by 6 dB to effectively drop the sync tips below the typical picture level. Therefore, increasing the gain by a corresponding 6 dB restores the correct sync to picture level. To detect the timing and tagging pulses, there is provided a sound carrier AM demodulator and pulse detector circuit 42. The demodulator is tuned to the sound carrier frequency and provides discrimination so as to isolate the video signal spectrum. The timing signals modulated on the sound or audio carrier and the tagging signals which precede them on the predetermined horizontal line are detected for use in providing the restore pulse to the switchable gain amplifier and for decoding purposes to determine if descrambling is authorized.

The output pulses from the demodulator and pulse detector 42 trigger a horizontal sync insertion delay timer 44. This timer may be a digital logic circuit with counters to provide the delay time, or a one-shot. The timer outputs an 11 microsecond pulse aligned with the horizontal blanking interval. This pulse is the restore pulse which will switch the amplifier 40 to the 6 dB gain condition and descramble the TV signal. An AND gate 46 controls the application of the restore pulse to the amplifier 40. The restore pulse is applied only if the descrambling system is authorized to descramble the premium channel programming.

The authorization code detector is provided by much of the remaining circuitry shown in FIG. 3. Unless the authorization code is transmitted by sending the tagging pulse ahead of the timing pulse during the predetermined horizontal line, the AND gate remains inhibited and the switchable gain amplifier 40 is disabled from descrambling the TV signal.

A two-bit shift register 48 consisting of two D flip-flops 50 and 52 detects the presence of the tagging pulse preceding the timing pulse. The first stage 50 of the register 48 toggles to the "high" state when the first pulse is received. The second stage 52 of the register 48 toggles "high" only if a second pulse is received in the same horizontal line interval. This is because the shift register is reset by the output of the delay timer 44, shaped in a 1 microsecond one-shot 54 at the end of the horizontal line (i.e., during the horizontal pulse interval when sync tip insertion can occur).

A 9-bit binary counter 56 counts the current horizontal line since the last vertical retrace (i.e., from the beginning of the picture field). A vertical interval retrace detector 58 senses the absence of timing pulses during the vertical retrace interval and causes the counter 56 to reset to "0" just prior to the beginning of a new picture field. The counter 56 toggled and counts the timing and tag pulses which are applied to its count input from the first stage 50 of the register 48. The first cell flip-flop 50 provides a sharp transition to assure a proper count.

The state of the stages of the counter 56 is used as an address code for a programmable read only memory (PROM) 60. This memory is programmed with either a "0" or a "1" at each address location between location 1 and location 262. The "1" means that a particular channel is authorized to be descrambled, while a "0" means that authorization is not permitted.

The descrambling is authorized and the authorization code provided by the tagging pulse occurs, if a tag pulse occurs and a "1" is stored at the address pointed to by the horizontal line counter 56. If the tag pulse does not coincide with an authorized address in the PROM 60, the descrambler remains disabled. The authorized output from the PROM may, if desired, be applied directly to the AND gate 46.

It is desirable, however, to use a digital integrator 62 for noise immunity thereby obviating to a great extent the possibility of either missing a tagging pulse or adding an extraneous tagging pulse due to operation in a noisy signal environment. The digital integrator 62 uses a 4-bit binary up-down counter 64 which averages the authorization commands over 16 picture fields. The integrator has a latch flip-flop 66 which is set only after having received 16 correct commands through the AND gate 68. It will be observed that a reset does not result until at least 16 incorrect commands are received through the other AND gate 70 of the integrator 62. Accordingly, the authorization code will be quickly acquired and then maintains the descrambler in operation. In the event that the TV signal is not scrambled and timing pulses are absent, the vertical interval reset timer 58 remains in a "high" state. The switchable gain amplifier remains in a 0 dB gain state, such that the sync pulses, which have not been suppressed in the unscrambled signal, pass in proper amplitude to the channel output.

An electronic switch 72, an OR gate 74, and a 6-bit counter 76 further scramble the signal in the absence of the authorization code. The vertical interval reset timer 58 toggles the counter 76 so as to provide a square wave pulse train with a 1 second period (½ second "high" and ½ second "low"). This square wave passes through the OR gate 74 and successively causes the switch 72 to open and close for ½ second intervals, thereby chopping and further scrambling the TV signal. The chopping square wave signal is overridden when an authorization code is detected, since the latch flip-flop 66 goes "high". A field rate pulse detector 78 provides a "high" or enable output to override the chopping square wave. This detector may be a triggerable flip-flop which has a timer (a one-shot) which causes it to remain "high" if the vertical interval reset timer remains "high" continuously, as is the case when an unscrambled or normal signal is transmitted on the premium channel and there are no timing pulses.

From the foregoing description it will be apparent that there has been provided an improved system for scrambling and descrambling premium subscription TV programming which provides high level coding with a minimum of hardware complexity. Variations and modifications of the herein described system within the scope of the invention will undoubtedly suggest themselves to those skilled in the art. Accordingly, the foregoing description should be taken as illustrative and not in a limiting sense.

I claim:

1. In a television system wherein television signals are scrambled and are encoded with tagging pulses in time relationship with repetitive pulses one of which occurs for each horizontal line of each picture field, and one of which tagging pulses occurs in succession with said repetitive pulses during the interval of at least one predetermined horizontal line of each picture field, a descrambling system which comprises means responsive to the consecutive occurrence of one of said tagging and one of said repetitive pulses during the interval of a horizontal line of said picture field for providing a first output, means for counting said repetitive pulses occurring during each said field to provide counts corresponding to successive ones of said lines, and means for enabling the descrambling of said TV signal when said counting means provides a count equal to a predetermined authorization count corresponding to said predetermined line in coincident time relationship with said first output.

2. The invention according to claim 1 wherein said system is a sync-suppressed scrambling system, said repetitive pulses are timing pulses in delayed time relationship with the horizontal sync pulses of said TV signal, said first output providing means comprising shift register means responsive to said timing and tagging pulses for providing said first output when signals corresponding to said tagging and timing pulses are stored therein, means for resetting said shift register means substantially coincidentally with the occurrence of said horizontal sync pulses, and means responsive to said timing pulses for restoring the amplitude of said horizontal sync pulses to descramble said TV signals when enabled by said enabling means.

3. The invention as set forth in claim 1 wherein said counting means comprises a counter having capacity to count at least up to or greater than the number of lines in said field, means for resetting said counter prior to each field, and means for decoding a count equal to said predetermined number to provide a second output for operating said enabling means when said first and said second outputs are in coincident time relationship.

4. The invention as set forth in claim 3 wherein said resetting means comprises means for detecting a vertical sync interval of said TV signal, and said decoding means is a PROM addressed by said counter and programmed to provide said second output when an address corresponding to said predetermined number is applied thereto.

5. The invention as set forth in claim 3 wherein said means for operating said enabling means comprises digital integrator means for maintaining said enabling means operated so long as said first and second outputs are coincident on average during a predetermined number of consecutive fields.

6. The invention as set forth in claim 3 further comprising means responsive to said repetitive pulses for counting said fields, and means operated by said field counting means when the descrambling of said TV signal is not enabled for switching said TV signal on and off thereby further scrambling said TV signal.

7. The method of scambling and descrambling TV signals which comprises the steps of generating at least one tagging pulse which corresponds uniquely to at least one predetermined horizontal line of the lines in each picture field of the TV signals by occurring coincidentally with said predetermined horizontal line, scrambling said TV signals, transmitting said scrambled signals with said tagging pulse to receiving stations, storing information identifying such predetermined horizontal line at a receiving station, identifying in response to the stored information the reception of said tagging pulse in coincidence with said predetermined horizontal line at a receiving station, and descrambling said TV signals at said receiving station when the reception of said tagging pulse and said predetermined line in coincidence with each other is identified.

8. The method according to claim 7 wherein said identifying step includes the step of counting said lines as they occur during said fields, and detecting the occurrence of each of said tagging pulse and the counting of a predetermined number of said lines.

9. The method according to claim 8 wherein said generating step comprises generating said tagging pulse in synchronism with said predetermined line.

10. The method according to claim 9 further comprising generating timing pulses in synchronism with each of the horizontal lines of said picture field and generating said tagging pulse during the interval of said predetermined horizontal line, and said counting step is carried out by counting said timing pulses to detect the occurrence of said predetermined line.

11. The method according to claim 10 wherein said scrambling step is carried by suppressing the horizontal sync pulses of said TV signal in predetermined time relationship with said timing pulses, and said descrambling step is carried out by restoring the amplitude of said horizontal sync pulses in predetermined time relationship with said timing pulses when the counting of a predetermined number of said timing pulses (which indicates the occurrence of said predetermined line) and the reception of a tagging pulse occurs during the interval of said predetermined horizontal line.

12. The method according to claim 11 wherein said transmitting step comprises the step of modulating the audio signals of said TV signals with said timing and tagging pulses to encode said TV signals, and demodulating said audio signals at said receiving station to derive said timing and tagging pulses.

13. The method of descrambling TV signals which have been encoded with tagging signals which occur uniquely during the interval of at least one predetermined line of the lines in each field of said TV signals, which method comprises the step of detecting said tagging signals, storing information identifying said predetermined line detecting the occurrence of said predetermined line in response to said stored information, identifying the simultaneous detection of said tagging signals and said predetermined line, and enabling the descrambling of said TV signals when said tagging signals are identified as simultaneously occurring with said predetermined line.

14. The method according to claim 13 wherein said TV signals are also encoded with scrambling control signals, further comprising detecting said control signals, and inhibiting said control signals to prevent descrambling of said signals in the absence of the identification of said tagging signals as occurring simultaneously with said predetermined line.

15. The method according to claim 13 wherein said step of detecting the occurrence of said predetermined line comprises the steps of counting said lines, and said identifying step comprises detecting the occurrence of said tagging signal when no less and no more than a a predetermined number of lines is counted, which number corresponds to said predetermined line.

16. The method according to claim 15 wherein said control signals are timing signals which control the descrambling of the TV signals and occur in predetermined time relationship with the horizontal sync pulses of said TV signals and are encoded with said tagging signals, said counting step is carried out by counting said timing signals to count said lines, and said enabling step is carried out to enable the descrambling of said TV signals in response to said timing signals when said tagging signals occur coincident with the occurrence of a count equal to said predetermined number.

17. The method according to claim 12 further comprising chopping said TV signal to further scramble said TV signal in the absence of identification of said tagging signals as occurring simultaneously with said predetermined line.

18. The system for scrambling and descrambling TV signals which comprises means for generating at least one tagging pulse which corresponds uniquely to at least one predetermined line of the horizontal lines in each picture field of the TV signals by occurring coincidentally only with said predetermined line, means for scrambling said TV signals, means for transmitting said scrambled signals with said tapping pulse to receiving stations, means for storing information identifying said predetermined line, means responsive to said stored information for identifying the reception of said tagging pulse in coincidence with said predetermined line at a receiving station, and means for descrambling said TV signals at said receiving station when the reception of said tapping pulse and said predetermined line in coincidence with each other is identified.

19. The system according to claim 18 wherein said identifying means includes means for counting said lines as they occur during said field, and means for detecting the occurrence of said tagging pulse upon a count corresponding no less and no more than to said predetermined line.

20. The system according to claim 19 wherein said generating means comprises means for generating said tagging pulse in synchronism with said predetermined line.

21. The system according to claim 20 further comprising means for generating time pulses in synchronism with each of said lines of said field and for generating said tagging pulse during the interval of said predetermined horizontal line, and said counting means is operable for counting said timing pulses to detect the occurrence of said predetermined line.

22. The system according to claim 21 wherein said scrambling means comprises means for suppressing the horizontal sync pulses of said TV signal in predetermined time relationship with said timing pulses, and said descrambling means comprises means for restoring the amplitude of said horizontal sync pulses in predetermined time relationship with said timing pulses when the counting of a predetermined number of said timing pulses (which indicates the occurrence of said predetermined horizontal line) and the reception of a tagging pulse occurs during the interval of said predetermined horizontal horizontal line.

23. The system according to claim 22 wherein said transmitting means comprises means for modulating the audio signals of said TV signals with said timing and tagging pulses to encode said TV signals, and means for demodulating said audio signals at said receiving station to derive said timing and tagging pulses.

24. The system for descrambling TV signals which have been encoded with tagging pulses which occur uniquely during the interval of at least one predetermined horizontal line in each field of said TV signals, which system comprises means for detecting said tagging signals, means for storing information identifying said predetermined horizontal line, means responsive to said storing means for detecting the occurrence of said predetermined horizontal line, means for identifying the simultaneous detection of said tagging signals and said predetermined line, and means for enabling the descrambling of said TV signals when said tagging signals are identified as simultaneously occurring with said predetermined line.

25. The system according to claim 24 wherein said TV signals are also encoded with scrambling control signals, further comprising means for detecting said control signals and inhibiting said control signals to prevent descrambling of said signals in the absence of the identification of said tapping signals as occurring simultaneously with said predetermined line.

26. The system according to claim 25 wherein said identifying means comprises means for counting said lines, and means for detecting the occurrence of said tagging signal when no less and no more than a predetermined number of lines is counted, which corresponds to said predetermined line.

27. The system according to claim 26 wherein said control signals are timing signals which control the descrambling of the TV signals and occur in predetermined time relationship with the horizontal sync pulses of said TV signals and are encoded with said tagging signals, said counting means comprising means for counting said timing signals to count said lines, and said enabling means being operable to enable the descrambling of said TV signals in response to said timing signals when said tagging signals occur coincident with the occurrence of a count equal to said predetermined number.

28. The system according to claim 23 further comprising means for chopping said TV signal to further scramble said TV signal in the absence of identification of said tagging signals as occurring simultaneously with said predetermined line.

* * * * *